_United States Patent Office_

3,433,842
Patented Mar. 18, 1969

3,433,842
PROCESS FOR THE HYDROGENATION OF TRANS, CIS-1,5-CYCLODECADIENE TO CIS-CYCLODECENE
James Hoekstra, Evergreen Park, Ill., assignor to Universal Oil Products Company, Des Plaines, Ill., a corporation of Delaware
No Drawing. Filed Apr. 12, 1967, Ser. No. 630,195
U.S. Cl. 260—666                                         10 Claims
Int. Cl. C07c 5/04, 5/16, 5/14

ABSTRACT OF THE DISCLOSURE

A process for converting trans,cis-1,5-cyclodecadiene to cis-cyclodecene utilizing a palladium hydrogenation catalyst. The cyclodecadiene contains an amine to modify the isomerization of the cyclodecadiene to undesirable by-products.

BACKGROUND OF THE INVENTION

This invention relates to a process for converting trans, cis-1,5-cyclodecadiene to cis-cyclodecene, a useful intermediate in the production of sebacic acid. The trans,cis-1,5-cyclodecadiene, selectively hydrogenated to cis-cyclodecene in accordance with the method of this invention, is known in the art, being prepared, for example, by the cyclocooligomerization of moles of butadiene with one mole of ethylene in the presence of a catalyst described as a $\pi$-allyl nickel complex. A description of the trans,cis-1,5-cyclodecadiene as well as its preparation is found in Angewandte Chemie, International Edition, vol. 2, No. 3, p. 105, March 1963, and vol. 3, No. 10, p. 702 October 1964. The trans,cis-1,5-cyclodecadiene can be converted to cis-cyclodecene by conventional hydrogenation techniques although selectivity is markedly less than desired and inadequate for industrial use. The process of this invention enables one to achieve a selectivity in excess of 89% at 100% conversion. Optimum conversion is desirable since it is extremely difficult to separate the unconverted cyclodecadiene by conventional methods for recycle in a continuous process, or for recovery in a batch process. It has been observed that the selective hydrogenation of trans,cis-1,5-cyclodecadiene is drastically impaired by the formation of a cyclodecadiene isomer, tentatively identified as cis,cis-1,6-cyclodecadiene. This isomer, melting at 26.5–28° C., has been isolated and found to be extremely difficult to hydrogenate with any appreciable degree of selectivity—the fully saturated cyclodecane comprising a substantial portion of the hydrogenation product. It has been shown that the undesired formation of this isomeric cyclodecadiene is minimized and trans,cis-1,5-cyclodecadiene converted to cis-cyclodecene in excess of 89% yields at 100% conversion, utilizing a platinum catalyst. For example, see U.S. Patent 3,285,983 issued to J. T. Arrigo. Palladium has heretofore been considered to be unacceptable as a catalyst since it causes excessive isomerization of the trans,cis-1,5-cyclodecadiene to the isomeric cyclodecadiene. However, by the process of this invention palladium can be utilized to attain at least an equivalent conversion of the trans,cis-1,5-cyclodecadiene with at least an equivalent selectivity to the desired cis-cyclodecene, and with a minimum formation of the undesirable isomeric cyclodecadiene. It is therefore an object of this invention to present a novel process for effecting an optimum conversion of trans,cis-1,5-cyclodecadiene to produce commercially acceptable yields of cis-cyclodecene utilizing a palladium hydrogenation catalyst.

SUMMARY OF THE INVENTION

In one of its broad aspects, the present invention embodies a process for the selective hydrogenation of trans, cis-1,5-cyclodecadiene to form cis-cyclodecene which comprises admixing a primary amine with said cyclodecadiene and heating the mixture in contact with a palladium hydrogenation catalyst at a temperature of from about −50° C. to about 80° C. and under a hydrogen pressure of from about 200 to about 1500 p.s.i.g. said primary amine comprising at least one amino group attached to a hydrocarbyl radical selected from the group consisting of alkyl cycloalkyl and aralkyl.

One of the more specific embodiments of the present invention is in a process for the selective hydrogenation of trans,cis-1,5-cyclodecadiene to form cis-cyclodecene which comprises admixing from about 0.03 to about 0.15 weight percent ethylenediamine with said cyclodecadiene and heating the mixture in contact with a palladium hydrogenation catalyst comprising from about 0.1 to about 5.0 weight percent palladium composited with alumina at a temperature of from about 0° C. to about 30° C. and under a hydrogen pressure of from about 500 p.s.i.g. to about 1000 p.s.i.g.

Other objects and embodiments of this invention will become apparent in the following more detailed specification.

In accordance with the present process, the trans,cis-1,5-cyclodecadiene is admixed with a primary amine preliminary to treating said cyclodecadiene in contact with the palladium hydrogenation catalyst, said primary amine comprising at least one amino group attached to a hydrocarbyl radical selected from the group consisting of alkyl, cycloalkyl and aralkyl. Suitable primary amines thus include methylamine, ethylamine, propylamine, isopropylamine, n-butylamine, t-butylamine, isoamylamine, n-hexylamine etc., and also alkylpolyamines such as diethylenetriamine, triethylenetetramine, etc., and particularly alkyldiamines for example ethylenediamine, 1,3-propanediamine, 1,3-butanediamine, 1,4-butanediamine, 3,5-pentanediamine 1,6-hexanediamine, 110-decanediamine and the like the lower molecular weight alkyldiamines containing up to about 6 carbon atoms being preferred. Cycloalkylamines such as cyclobutylamine, cyclopentylamine, cyclopentanediamine, cyclohexylamine, etc., and also aralkylamines like benzylamine, 1-amino-3-phenylpropane, 1,3-diamino-4-phenylbutane, and the like are also operable. It is contemplated that the described primary amines may contain other substituents which are inert at reaction conditions. The selected primary amine is suitably admixed with the cyclodecadiene charge stock in an amount to comprise from about 0.03 to about 0.15 weight percent of the cyclodecadiene contained therein.

The palladium hydrogenation catalyst usually comprises a carrier material which may or may not contribute to the over-all activity of the catalyst. Suitable carrier materials include synthetically prepared refractory inorganic oxides such as alumina, silica, zirconia, thoria, boria, etc., and also charcoals produced by the destructive distillation of wood, peat, lignite, nut shells, bones, and other carbonaceous matter, particularly such charcoals as have been heat treated and/or chemically treated to form a highly porous structure and generally described as activated carbon. Suitable carrier materials also include the naturally occurring clays and silicates, for example, diatomaceous earth, kieselghr etc., and also fuller's earth, attapulgus clay, feldspar, montmorillonite, halloysite, kaolin and the like.

The selective hydrogenation herein contemplated is preferably effected in contact with a catalytic composite comprising palladium and alumina. The alumina is preferably synthetic alumina although naturally occurring alumina such as is recovered from bauxite may also be utilized. The description "alumina" is intended to include porous alumina in its various states of hydration and generally referred to as activated alumina. Synthetically prepared alumina may be of the gel type generally prepared by precipitation methods. For example, an alkaline reagent such as ammonium hydroxide is commingled with an aqueous solution of aluminum chloride, or other suitable acidic solution of an aluminum salt, to precipitate the desired alumina. An alternative method comprises commingling hydrochloric acid, sulfuric acid, or the like, with an alkaline solution of an aluminum salt, for example, sodium aluminate, and precipitating alumina.

The alumina may be utilized in the form of spheres, extrudates, granules, briquettes, or the like. A preferred form is the low density sphere prepared, for example, by the well-known oil-drop method wherein a sol, prepared by digesting aluminum in sulfuric acid at a controlled pH, is discharged by means of a nozzle or rotating disc into a hot oil bath, forming gel particles during passage therethrough. This method is fully described in U.S. Patent 2,620,314 issued to the present inventor. In any case, the alumina is activated by one or more treatments including drying, calcining, steaming, or treatment with various chemical reagents to develope a highly porous material.

The catalytic composite of this invention may comprise from about 0.1 to about 5.0 weight percent palladium. Although a higher concentration of palladium is operable, no particular benefit is derived therefrom, particularly in view of the cost of the catalyst involved. A palladium content of from about 0.3 to about 3.0 weight percent is preferred. The quantity of palladium is based on the weight of the final catalyst composite and calculated on the basis of elemental metal notwithstanding that the palladium may exist in some complex combination with the alumina or in the elemental state.

The palladium is composited with the alumina by any suitable method. For example, the alumina can be soaked, dipped, or otherwise immersed in a solution of a suitable palladium compound including palladium chloride, chloropalladic acid, and the like. It is understood that the description "palladium" connotes palladium existing in its elemental state and/or in a combined form with the alumina, often reported as palladium oxide.

The catalyst composite is dried and calcined prior to use. Calcination is suitably effected at a temperature of at least about 425° C., generally at a temperature on the range of from about 425° C. to about 815° C. and preferably in a reducing atmosphere such as hydrogen.

Selective hydrogenation of the trans, cis-1,5-cyclodecadiene is suitably effected within a period of from about 1 to about 48 hours at a temperature of from about −50° C. to about 80° C., the rate of hydrogenation increasing with temperature. Selectivity drops off somewhat with increasing temperature but is substantially uneffected within the preferred temperature range of from about −10° C. to about 30° C. While it would appear that a hydrogen concentration in excess of stoichiometric amount would be detrimental in the selective hydrogenation of one of two double bonds as herein contemplated, an excess is in fact essential. The hydrogen concentration, expressed in terms of hydrogen pressure, may be from about 200 to about 1500 p.s.i.g., and is preferably from about 500 to 1000 p.s.i.g.

The process of this invention can be effected batchwise or in a continuous flow type of operation. For example, a high pressure reaction vessel, such as an autoclave, designed for the introduction of hydrogen and equipped with temperature control means, can be employed. The catalyst is placed in the autoclave together with the cyclodecadiene charge. It is preferable to include an inert solvent in a substantial amount to aid in the dissipation of the heat of reaction. Cyclohexane, n-heptane, etc., is a suitable solvent, as is benzene or other aromatic hydrocarbon, aromatic hydrocarbons being substantially inert to hydrogenation at the reaction conditions herein employed. The autoclave is flushed one or more times with dry nitrogen and then pressured to the desired initial pressure with hydrogen. Since hydrogen is consumed in the reaction, progress of the reaction can be ascertained with reference to pressure although it may be desired to maintain a constant pressure by the continuous or intermittent addition of hydrogen to the reaction vessel. On completion of an adequate residence time at reaction conditions, the autoclave is vented and the liquid content decanted from the catalyst. The reaction product at 100% trans,cis-1,5-cyclodecadiene conversion is stable at distillation conditions, even at atmospheric pressure, and is readily distilled under a nitrogen blanket to yield the desired cis-cyclodecene product.

The cyclodecadiene can be selectively hydrogenated to cyclodecene in a continuous manner on a once-through basis. For example, the cyclodecadiene, together with a substantially inert solvent such as n-heptane, is charged to a high pressure reaction chamber equipped with temperature control means and containing the catalyst disposed in a fixed bed therein. The reaction chamber is maintained at the desired pressure by means of hydrogen charged thereto either in a separate stream or commingled with cyclodecadiene charge. The reactor effluent is recovered in a high pressure separator adequately cooled to insure separation of liquid and gaseous phases. The gaseous phase, comprising hydrogen, is recycled to the reaction chamber while the liquid phase is metered through a pressure reducing valve and passed to a distillation column for the separation of solvent and by-products and recovery of cis-cyclodecene.

The following examples are presented in illustration of the process of this invention and are not intended as an undue limitation on the generally broad scope of the invention as set out in the appended claims.

EXAMPLE I

The crude cyclodecadiene charge stock was diluted with an equal amount of n-heptane and processed over a palladium catalyst in admixture with hydrogen. The catalyst was disposed in a fixed bed in a ¼ inch OD stainless steel tubular reactor and consisted of about 1.5 weight percent palladium on alumina. In view of the limited dimensions of the reactor the catalyst was ground to give a 40–60 mesh material. The crude cyclodecadiene contained 75.9 weight percent trans,cis-1,5-cyclodecadiene by gas-liquid chromatography analysis, the remainder comprising principally n-decatriene and cyclododecatriene. The reactor was maintained in a glycol-water bath to permit operation at a temperature of about 5° C. After the bath was brought to the desired temperature, the reactor, previously charged with six cubic centimeters of catalyst, was installed. Hydrogen pressure and flow rate were established at 750 p.s.i.g. and 2.5 s.c.f./hr. Thereafter the cyclodecadiene was charged to the reactor admixed with the hydrogen and processed over the catalyst. The liquid hourly space velocity (LHSV) required to maintain a 100% conversion level was determined to be about 2.9. Over a two hour test period, the reactor effluent was collected in a high pressure receiver, the excess hydrogen being discharged rather than recycled. The liquid product was analyzed by gas-liquid chromatography methods which indicated the following product distribution based on the cyclodecadiene charged and expressed as weight percent.

Trans,cis-1,5-cyclodecadiene _____ 0
Isomeric cyclodecadiene _____ 18.0
Cis-cyclodecene _____ 77.4
Cyclodecane _____ 4.6

EXAMPLE II

A crude cyclodecadiene was diluted with about an equal volume of n-heptane containing approximately 0.03 weight percent ethylenediamine based on the cyclodecadiene. The crude cyclodecadiene charge stock contained 73.2 weight percent trans,cis-1,5-cyclodecadiene by gaschromatography analysis, the remainder containing principally n-decatriene and cyclododecatriene. The mixture was then processed over the catalyst described in Example I, together with hydrogen, in substantially the same manner and at substantially the same conditions. The LHSV required to maintain a conversion of 100% was determined to be about .42. The following product distribution, expressed as weight percent, and based on the cyclodecadiene charged, was obtained.

Trans,cis-1,5-cyclodecadiene _____ 0.2
Isomeric cyclodecadiene _____ 5.1
Cis-cyclodecene _____ 92.6
Cyclodecane _____ 2.1

EXAMPLE III

A crude cyclodecadiene charge stock was diluted with about an equal volume n-heptane containing approximately .072 weight percent 1,4-butanediamine based on the cyclodecadiene. The crude cyclodecadiene charge stock contained 69.1 weight percent trans,cis-1,5-cyclodecadiene by gas-liquid chromatography analysis, the remainder containing principally n-decatriene and cyclododecatriene. The mixture is then processed over the catalyst described in Example I together with hydrogen, in substantially the same manner and at substantially the same conditions. The LHSV required to maintain a conversion of 100% was determined to be about .40. The following product distribution, expressed as weight percent and based on the cyclodecadiene charged, was obtained.

Trans,cis-1,5-cyclodecadiene _____ 0.3
Isomeric cyclodecadiene _____ 7.6
Cis-cyclodecene _____ 91.8
Cyclodecane _____ 0.3

EXAMPLE IV

A crude cyclodecadiene charge stock was diluted with about an equal volume of n-heptane containing approximately .045 weight percent 1,3-butanediamine based on the cyclodecadiene. The crude cyclodecadiene charge stock contained 75.9 weight percent trans,cis-1,5-cyclodecadiene by gas-liquid chromatography analysis, the remainder comprising principally n-decatriene and cyclododecatriene. The mixture was then processed over the catalyst described in Example I, together with hydrogen in substantially the same manner and at substantially the same conditions. The LHSV required to maintain a conversion of about 100% was determined to be about .37. The following product distribution, expressed as weight percent and based the cyclodecadiene charged, was obtained.

Trans,cis-1,5-cyclodecadiene _____ 0
Isomeric cyclodecadiene _____ 5.5
Cis-cyclodecene _____ 93.7
Cyclodecane _____ .8

I claim as my invention:
1. A process for the selective hydrogenation of trans, cis-1,5-cyclodecadiene to form cis-cyclodecene which comprises admixing a primary amine with said cyclodecadiene and heating the mixture in contact with a palladium hydrogenation catalyst at a temperature of from about −50° C. to about 80° C. and under a hydrogen pressure of from about 200 to about 1500 p.s.i.g., said primary amine comprising at least one amino group attached to a hydrocarbyl radical selected from the group consisting of alkyl, cycloalkyl and aralkyl.

2. The process of claim 1 further characterized in that said palladium catalyst comprises from about 0.1 to about 5.0 weight percent palladium composited with alumina.

3. The process of claim 2 further characterized in that said temperature is a temperature of from about −10° C. to about 30° C.

4. The process of claim 3 further characterized in that said pressure is a pressure of from about 500 to about 1000 p.s.i.g.

5. The process of claim 4 further characterized in that said amine comprises from about 0.03 to about 0.15 weight percent of said cyclodecadiene.

6. The process of claim 5 further characterized in that said primary amine is an alkylpolyamine.

7. The process of claim 6 further characterized in that said polyamine is a diamine.

8. The process of claim 7 further characterized in that said diamine is ethylenediamine.

9. The process of claim 7 further characterized in that said diamine is 1,3-diaminopropane.

10. The process of claim 7 further characterized in that said diamine is 1,3-diaminobutane.

References Cited
UNITED STATES PATENTS 3,285,983 11/1966 Arrigo.
3,294,853 12/1966 Arrigo.
3,296,320 1/1967 Arrigo.
3,360,577 12/1967 Pickles.

PAUL M. COUGHLAN, Jr, *Primary Examiner.*

V. O'KEEFE, *Assistant Examiner.*